United States Patent [19]

Yeakey et al.

[11] Patent Number: 4,578,205
[45] Date of Patent: Mar. 25, 1986

[54] USE OF METHYLENE AZELAIC ACID AS A CORROSION INHIBITOR

[75] Inventors: Ernest L. Yeakey; George P. Speranza; Carol A. Triebel; David R. McCoy, all of Austin, Tex.

[73] Assignee: Texaco, Inc., White Plains, N.Y.

[21] Appl. No.: 697,193

[22] Filed: Feb. 1, 1985

[51] Int. Cl.$^4$ ................................................. C09K 5/00
[52] U.S. Cl. ........................................ 252/76; 252/73; 252/79; 252/82; 252/174.18; 252/180; 252/396; 562/595
[58] Field of Search ........................ 252/73, 76, 79, 82, 252/174.18, 180, 388, 396; 562/595

[56] References Cited

U.S. PATENT DOCUMENTS

| | | | |
|---|---|---|---|
| 2,641,607 | 6/1953 | Albisetti et al. | 260/465.3 |
| 2,722,516 | 11/1955 | Merker | 252/396 |
| 2,726,215 | 12/1955 | Jones | 252/76 |
| 2,767,144 | 10/1956 | Gottshall | 252/396 |
| 3,678,102 | 7/1972 | Isard et al. | 562/595 |

FOREIGN PATENT DOCUMENTS 2036062  6/1980  United Kingdom .

*Primary Examiner*—Paul Lieberman
*Assistant Examiner*—Hoa Van Le
*Attorney, Agent, or Firm*—Jack H. Park; Kenneth R. Priem; Richard A. Morgan

[57] ABSTRACT

The use of methylene azelaic acid having the formula $CH_2=C-[(CH_2)_3-COOH]_2$ or an alkali metal salt thereof in glycol and water based automotive antifreeze formulations is described. Unlike natural dicarboxylic acids such as sebacic acid, methylene azelaic acid does not form a precipitate and drop out of solution, rendering the antifreeze unprotected against corrosion. The methylene azelaic acid component should be present in an amount of from 1.5 to 4.5 wt. % based on the glycol component.

12 Claims, No Drawings

USE OF METHYLENE AZELAIC ACID AS A CORROSION INHIBITOR

BACKGROUND OF THE INVENTION

1. Field of the Invention

The invention relates to corrosion-inhibited aqueous solutions, and particularly relates to corrosion-inhibited antifreeze compositions containing dicarboxylic acids useful as coolants in a heat exchange system such as the cooling system of an internal combustion engine.

2. Other Inhibitors Known in the Art

It is well known to use dicarboxylic acids as corrosion inhibitors in aqueous systems. For example, Jones in U.S. Pat. No. 2,726,215 teaches that dicarboxylic acids; namely, sebacic acid and azelaic acid, and their alkali metal and alkali earth metal salts are useful corrosion inhibitors in aqueous solutions. The use of a mixture of sodium sebacate (sodium salt of sebacic acid) and benzotriazole was disclosed as a useful corrosion inhibitor in engine coolants by G. Butter, et al. in "Inhibitor Formulations for Engine Coolants," *British Corrosion Journal*, Vol. 12, No. 3, 1977, pp. 171–174. Similarly, British Military Specification TS 10177 calls for the use of disodium sebacate and benzotriazole in antifreeze formulation AL-39. The specification uses 4.0–4.5 wt.% disodium sebacate and 0.25–0.3 wt.% benzotriazole.

U.S. Pat. No. 3,931,029 to Dutton, et al. teaches the use of certain unsaturated cycloalkylene dicarboxylic acids as antifreeze additives to inhibit corrosion of contacted solder alloys. Corrosion inhibitors containing an imidazoline derivative, a carboxylic acid or its metal salt and/or a phosphate are used for steel in brackish or acidic water according to Chemical Abstracts, Vol. 99, paragraph 126713x, 1983, which describes Japanese Kokai 58-84, 981. U.S. Pat. No. 4,382,008 reveals a corrosion-inhibited antifreeze containing a triazole, an alkali metal borate, an alkali metal benzoate, an alkali metal silicate and an alkali metal salt of a $C_7$ to $C_{13}$ dibasic organic acid. The use of sodium sebacate as a corrosion inhibitor in phosphate-based antifreezes is further seen in the Derwent Abstract of Week E14 for French Certificate of Utility No. 2,489,355 to Perrot.

The Derwent Abstract of Week K18 for European Pat. No. 77,767-B teaches the use of water-soluble salts of dicarboxylic acids having at least three carbon atoms as antifreeze corrosion inhibitors. These acids are malonic, succinic, glutaric and adipic acids along with smaller proportions of $C_8$ and/or $C_{10}$ dicarboxylic acids.

While the natural $C_8$ to $C_{12}$ dibasic acids; i.e. sebacic acid, azelaic acid, are useful as corrosion inhibitors in antifreeze, it has been discovered that when automobile antifreeze formulations containing these dicarboxylic acids, such as sebacic acid, are mixed with hard water, the sebacic acid completely falls out of solution as calcium sebacate forming a very heavy precipitate. This precipitate could plug radiators, thermostats and water pumps of automotive cooling systems and thus lead to rapid overheating of the engine. Since the corrosion inhibitor has been precipitated out of the system, corrosion would begin on the surfaces in contact with the unprotected formulation.

Thus, an object of the invention is to provide a dicarboxylic acid which is useful as a corrosion inhibitor and which does not precipitate out in the presence of hard water.

SUMMARY OF THE INVENTION

The invention concerns the use of a methylene azelaic acid component as a corrosion inhibitor in a glycol component and water antifreeze formulation. The methylene azelaic acid component is methylene azelaic acid alone or an alkali metal salt of methylene azelaic acid.

DETAILED DESCRIPTION OF THE PREFERRED EMBODIMENTS

It has been surprisingly discovered that methylene azelaic acid is a dicarboxylic acid which will not form a troublesome precipitate when mixed with hard water. The corrosion-inhibited antifreeze solution remains clear.

Methylene azelaic acid has the formula $CH_2=C-[(CH_2)_3-COOH]_2$ and is made by the following "ene" reaction between isobutylene and two moles of acrylonitrile followed by hydrolysis.

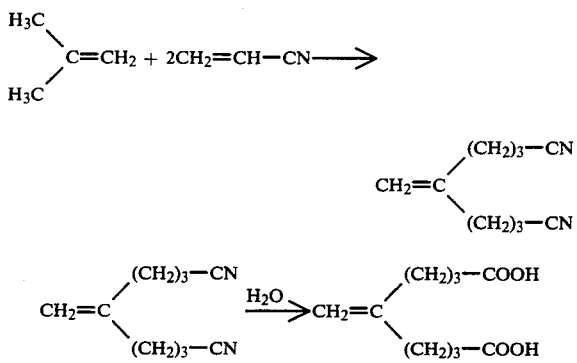

In reality, the methylene group probably isomerizes over the length of the middle alkylene, such that the methylene group is not always in the middle and methylene azelaic acid turns out to be a mixture of isomers.

Other similar compounds such as $CH_2=C-[(CH_2)_4-COOH]_2$ may work but would be difficult to synthesize and would have to use another route. If methyl methacrylate were used instead of acrylonitrile, it may be possible to make compounds such as

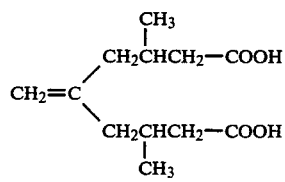

which may be useful corrosion inhibitors.

The methylene azelaic acid component useful as a nonprecipitating corrosion inhibitor may be methylene azelaic acid alone or an alkali metal salt of methylene azelaic acid such as sodium methyleneazelate.

Typically, this compound is used as a corrosion inhibitor in antifreeze formulations. The antifreeze formulations most commonly used include mixtures of water and glycols and/or glycol ethers. The glycol component which can be employed as a major component in the present composition may be one or more glycols such as ethylene glycol, diethylene glycol, propylene glycol, and dipropylene glycol, and/or glycol monoethers such as the methyl, ethyl, propyl and butyl ether of ethylene glycol, diethylene glycol, propylene glycol and dipropylene glycol. Also useful are glycol diethers such as methyl and ethyl diethers of ethylene glycol, diethylene glycol, propylene glycol and dipropylene glycol. Ethylene glycol is the particularly preferred glycol component.

The methylene azelaic acid component should be present on the order of 0.5 to 5.0 wt.% based on the glycol component, preferably 1.5 to 4.5 wt.%.

Other corrosion inhibitors and additives may be employed to a lesser extent in the antifreeze formulation. For example, alkali metal borates, which include sodium tetraborate, potassium tetraborate, sodium metaborate and potassium metaborate may be used. Other permissible, but not required, components include alkali metal silicates, such as sodium metasilicate, potassium metasilicate and lithium metasilicate. Also useful are the silicates represented by the formula $[M_{(1/a)}O]_bSiO_{(4-b)\frac{1}{2}}$ M is a cation that forms a water-soluble silicate, a is the valence of the cation represented by M and b has a value from 1 to 3, inclusive. See U.S. Pat. Nos. 3,337,496 and 3,312,622. Other allowable components include alkali metal nitrates, such as sodium nitrate and potassium nitrate, azoles such as alkali metal mercaptothiazoles and alkali metal tolyltriazoles, alkali metal nitrites such as potassium nitrite and sodium nitrite, alkali metal phosphates such as sodium phosphate and potassium phosphate, alkali metal benzoates and various foaming agents and dyes, if desired. The components should be present in amounts of equal to or less than 1 wt.% based on the glycol component, preferably from 0.01 to 1.0 wt.%, if they are used.

The amounts of these various other corrosion inhibitors which render them effective are well known in the art. Of course, the precise amount will vary for each inhibitor. It is not possible to set forth exactly the amount of the components of the corrosion-preventing mixture that might be desired due to the complicating influence of the various parts. Simple, accelerated aging tests can be used to determine the amount of silicate which when added will give the desired corrosion resistance.

The invention will be further illustrated by the following examples which are not intended to limit the invention, but rather to illuminate it.

EXAMPLE 1

A blend of ethylene glycol, 4.2 wt.% disodium salt of methylene azelaic acid and 0.2 wt.% tolyltriazole were prepared and tested in the ASTM D-1384 Glassware Corrosion Test. Results of this test are given in Table I.

TABLE I

| ASTM D-1384 Glassware Corrosion Test | | | | | | |
|---|---|---|---|---|---|---|
| | Wt. Loss, mg/coupon | | | | | |
| Example | Cu | 70/30 Solder | Brass | Steel | Iron | Aluminum |
| 1 | 4 | 2 | 4 | 0 | 1 | 3 |
| ASTM spec., max. | 10 | 30 | 10 | 10 | 10 | 30 |

EXAMPLE 2

The antifreeze composition prepared in Example 1 was tested in the ASTM D-4340 Aluminum Hot Surface Corrosion Test. This test gives a measure of the degree of protection an antifreeze has at aluminum heat rejecting surfaces. Results of this test are given in Table II.

TABLE II

| ASTM D-4340 Aluminum Hot Surface Corrosion Test | |
|---|---|
| | Weight Loss, mg/cm$^2$/wk |
| Example 2 | 0.65 |
| ASTM spec., max. | 1.0 |

EXAMPLES 3-7

Examples 3 through 7 will demonstrate that the disodium salt of methylene azelaic acid will not precipitate when contacted with hard water, unlike the disodium salt of other dicarboxylic acids such as sebacic acid and a $C_{11}$–$C_{12}$ dicarboxylic acid mix (undecanedioic and dodecanedioic).

Miscibility with hard water was measured according to test DIN 51367.6 from the Dainler-Benz specifications for antifreeze/coolant. The hard water and antifreeze are mixed in a 2:1 ratio, 60 ml of hard water with 30 ml of antifreeze. The hard water here has 540 ppm $CaCO_3$. The mixture is allowed to stand 24 hours at room temperature (about 25° C.). The appearance at the end of 24 hours is reported and any deposits are filtered, dried and weighed.

TABLE III

| DIN 51367.6 Hard Water Test | | | |
|---|---|---|---|
| Example | Solution | Appearance | Deposit wt., mg |
| 3 | 4.2 wt. % Na sebacate and tolyltriazole | Heavy, white precipitate | 1456 |
| 4 | 4.2 wt. % Na ($C_{12}$/$C_{11}$ mix) and tolyltriazole | Heavy, off-white precipitate | 1189 |
| 5 | 4.2 wt. % Na methylene azelate and tolyltriazole | Clear | 16 |
| 6 | Commercial formulation | Clear | 13 |

To pass this test, the solution should be clear and with deposit weights in the same range as the currently approved product (designated "commercial formulation"). Only the methylene azelaic acid formulation (Example 5) would pass this hard water test. The other diacids are not even close to being acceptable. The total inhibitor content appears to have precipitated in Examples 3 and 4.

For the purposes of this invention, hard water is defined as water with 200 ppm $CaCO_3$ or more, preferably 500 ppm $CaCO_3$ or more. At levels of 200 ppm, dicarboxylic acids with twelve or more carbon atoms give precipitates whereas acids with fewer carbon atoms, such as sebacic acid, are not adversely affected. However, at the 500 ppm level and above even these lighter acids give precipitate and a corrosion inhibitor such as methylene azelaic acid would be necessary.

EXAMPLE 7

A blend of ethylene glycol, 4.3 wt.% sodium methyleneazelate and tolyltriazole was prepared and tested as in Example 1 with the passing results given below.

TABLE IV

| ASTM D-1384 Glassware Corrosion Test | | | | | | |
|---|---|---|---|---|---|---|
| | Cu | Solder | Brass | Steel | Iron | Al |
| Ex. 7 formulation | 2 | 2 | 2 | 1 | 0 | 2 |
| ASTM spec., max. | 10 | 30 | 10 | 10 | 10 | 30 |

EXAMPLE 8

The antifreeze composition in Example 7 was tested in the Ford Aluminum Pitting Potential Test with the passing results given below.

TABLE V

| Ford Aluminum Pitting Potential Test | |
|---|---|
| | Potential, mV vs. SCE |
| Example 8 formulation | +120 |
| Ford spec., min. | −400 |

The methods and compositions of this invention may be further modified by one skilled in the art without departing from the spirit and scope of the invention, which are defined only in the appended claims. For example, a precise blend of corrosion inhibitors may form a particularly advantageous package.

We claim:

1. A corrosion-protected antifreeze composition comprising
   a. a glycol component selected from the group consisting of an alkylene glycol, an alkylene glycol ether and mixtures thereof, and
   b. an effective, corrosion-preventing amount of a methylene azelaic acid component selected from the group consisting of methylene azelaic acid alone having the formula $CH_2=C-[CH_2)_3-COOH]_2$ and alkali metal salts thereof said the methylene azelaic acid component present in a proportion ranging from about 1.5 to 4.5% based on the glycol component.

2. The antifreeze composition of claim 1 in which the glycol component is ethylene glycol.

3. The antifreeze composition of claim 1 in which at least one other corrosion inhibitor is employed, at levels of equal to or less than 1 wt.% each based on the glycol component which is selected from the group consisting of alkali metal borates, alkali metal silicates, alkali metal benzoates, alkali metal nitrates, alkali metal nitrites, alkali metal molybdates and triazoles.

4. A method for inhibiting corrosion of metal contacting an antifreeze containing a glycol component and water comprising
   adding to an antifreeze comprising a glycol component and water an effective amount of a methylene azelaic acid component selected from the group consisting of methylene azelaic acid alone and an alkali metal salt of methylene azelaic acid.

5. The method of claim 4 in which the glycol component is selected from the group consisting of an alkylene glycol, an alkylene glycol ether and mixtures thereof.

6. The method of claim 4 in which the glycol component is ethylene glycol.

7. The method of claim 4 in which the methylene azelaic acid component is present in a proportion ranging from about 1.5 to 4.5 wt.% based on the glycol component.

8. The method of claim 4 in which at least one other corrosion inhibitor is employed, at levels of equal to or less than 1 wt.% each based on the glycol component, which is selected from the group consisting of alkali metal borates, alkali metal silicates, alkali metal benzoates, alkali metal nitrates, alkali metal nitrites, alkali metal molybdates and triazoles.

9. A method for inhibiting corrosion of metal contacting an aqueous antifreeze containing a glycol component and hard water comprising
   adding to an antifreeze comprising hard water and a glycol component selected from the group consisting of an alkylene glycol, an alkylene glycol ether and mixtures thereof, an effective amount of a methylene azelaic acid component selected from the group consisting of methylene azelaic acid alone and an alkali metal salt of methylene azelaic acid.

10. The method of claim 9 in which the glycol component is ethylene glycol.

11. The method of claim 9 in which the methylene azelaic acid component is present in a proportion ranging from about 1.5 to 4.5 wt.% based on the glycol component.

12. The method of claim 9 in which at least one other corrosion inhibitor is employed, at levels of equal to or less than 1 wt.% each based on the glycol component, which is selected from the group consisting of alkali metal borates, alkali metal silicates, alkali metal benzoates, alkali metal nitrates, alkali metal nitrites, alkali metal molybdates and triazoles.

* * * * *

UNITED STATES PATENT AND TRADEMARK OFFICE
CERTIFICATE OF CORRECTION

PATENT NO. : 4,578,205

DATED : March 25, 1986

INVENTOR(S) : Ernest Leon Yeakey et al

It is certified that error appears in the above-identified patent and that said Letters Patent is hereby corrected as shown below:

Column 5, lines 29-30, the formula should read

-- $CH_2=C-[(CH_2)_3-COOH]_2$ --.

Signed and Sealed this

Twenty-fourth Day of June 1986

[SEAL]

Attest:

DONALD J. QUIGG

Attesting Officer

Commissioner of Patents and Trademarks